Aug. 1, 1939.   J. MOSS   2,167,671
CORSAGE PIN
Filed Dec. 18, 1937
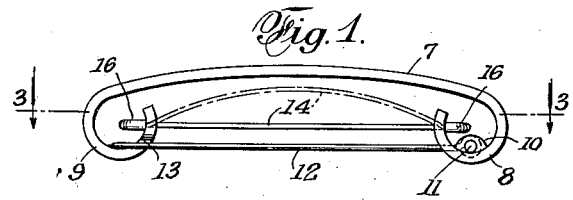
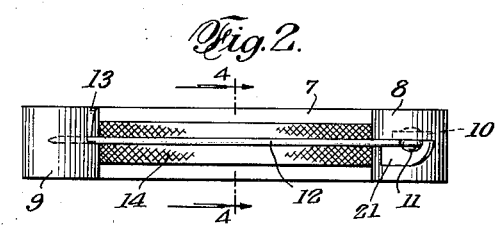
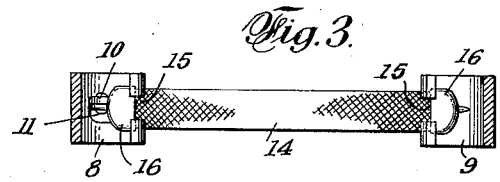
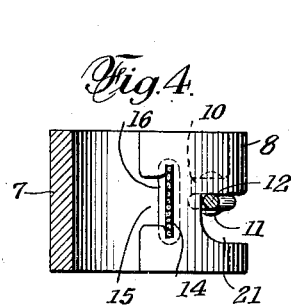
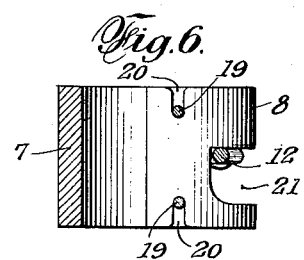
JANE MOSS
INVENTOR
BY
ATTORNEY Patented Aug. 1, 1939

2,167,671

UNITED STATES PATENT OFFICE 2,167,671

CORSAGE PIN

Jane Moss, New York, N. Y.

Application December 18, 1937, Serial No. 180,510

2 Claims. (Cl. 24—6)

The invention herein disclosed relates to pins for holding corsage bouquets.

Special objects of the invention are to provide a pin of simple and inexpensive construction and which will embody practical means for securely holding the bouquet and which can be readily manipulated for fastening to the garment and for properly holding the flowers.

Other desirable objects and the novel features of construction, combinations and relations of parts by which the objects are attained are set forth hereinafter and broadly covered in the claims appended.

The drawing accompanying and forming part of the specification illustrates certain practical embodiments of the invention, but it should be understood that structure may be modified and changed, all within the true spirit and broad scope of the invention.

Fig. 1 is an edge view of the pin, showing in broken lines how the elastic holding element may stretch or bow about the stems of a bouquet of flowers.

Fig. 2 is a rear view of the pin.

Fig. 3 is a sectional detail as on line 3—3 of Fig. 1.

Fig. 4 is an enlarged cross-sectional view as on line 4—4 of Fig. 2.

Fig. 5 is a broken part sectional rear view of a modified form of construction.

Fig. 6 is an enlarged cross-sectional detail as on line 6—6 of Fig. 5.

The body of the pin is shown as consisting simply of a one piece bar 7, slightly arched as viewed edgewise, Fig. 1 and having its opposite ends curled backwardly and inwardly upon themselves to form the rearwardly offset curved terminal portions of abutments 8, 9.

One curved end portion, 8, of the bar is shown as having a lug 10, partly severed and struck inwardly into the arc of curvature and as carrying a pivot 11, for the pin proper, 12.

The other rearwardly curved end portion 9, of the bar is shown as having a notch 13, providing a keeper for the free end of the pin.

In the first form of the invention, Figs. 1 to 4, an elastic band 14, of fabric covered rubber or the like, is stretched across the inturned ends of the bar in position to cooperate with the pin 12, for yieldingly gripping the stems of a bunch of flowers. This band is shown as secured in such relation by being entered in notches 15, cut in from the extreme ends of the bar and by having metallic or molded heads or abutments 16, on the ends of the band caught behind the curled end portions of the bar.

The fabric covered elastic band, forming a spring gripping element or resilient gripping means and mounted as described, provides both a frictional and a yielding grip on the bouquet, yielding as required, as indicated by broken lines in Fig. 1, to accommodate the flowers and to hold them securely against slipping out of position. If the band becomes worn, it can be readily replaced by slipping the worn band out of the notches and mounting a fresh band in position.

The form of the yielding holding element which is opposed to the pin may be varied. As illustrated in Figs. 5 and 6, such element may consist of a hairpin wire spring piece having a contracted neck portion 17, engaged in notches 18, in one end of the rearwardly curled end portion of the bar and substantially parallel spaced spring lengths 19, slidingly entered in notches 20, in the opposite end portion of the bar. The two lengths of spring wire 19, in cooperation with the pin 12, provide a three point form of grip for securely holding the flowers in any desired relation. This form of spring clamp, like the elastic band, is readily renewable, but ordinarily should last as long as any of the other of the parts of the pin. The integral hinge lug 10, struck inwardly from the rearwardly curved portion of the bar forms a firm mounting for the pin and locates the hinge of the pin within the curve of the bar end, where it is housed and protected and where it can cause no injury to the fabric of the corsage. The striking of this hinge lug inwardly of the bar end also provides sufficient opening 21, for the pin to project from the interior of the curved end lug outwardly toward the other opposite curved lug or end abutment 9.

What is claimed is:

1. A device for holding corsage bouquets, comprising a single bar, spaced rearwardly extending projections on the back of said bar and near the opopsite ends of the bar, a strip of elastic material connected with and supported by said spaced projections at the back of said bar and a pin located at the back of said elastic strip, pivotally engaged at one end with one of said projections and releasably engageable at the opposite end with the other of said relatively spaced projections and thereby positioned in cooperative bouquet clasping relation to the elastic strip located and supported in front of the same.

2. A combination as in claim 1, in which said rearwardly extending spaced projections on the back of said bar consist of integral portions at the ends of the bar extended rearwardly and thence forwardly toward the back of the bar and in which said forwardly extended portions are notched to receive the ends of the elastic strip to thereby support said strip in spaced relation between the back of the bar and the pin at the back of the strip.

JANE MOSS.